(12) United States Patent
Nordbruch

(10) Patent No.: US 10,387,738 B2
(45) Date of Patent: Aug. 20, 2019

(54) METHOD AND DEVICE FOR MONITORING A VEHICLE THAT IS IN AN AUTONOMOUS OPERATING MODE AND IS LOCATED IN A PARKING FACILITY

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 45 days.

(21) Appl. No.: 15/549,220

(22) PCT Filed: Jan. 22, 2016

(86) PCT No.: PCT/EP2016/051317
§ 371 (c)(1),
(2) Date: Aug. 7, 2017

(87) PCT Pub. No.: WO2016/128200
PCT Pub. Date: Aug. 18, 2016

(65) Prior Publication Data
US 2018/0039844 A1  Feb. 8, 2018

(30) Foreign Application Priority Data

Feb. 12, 2015  (DE) .................... 10 2015 202 488

(51) Int. Cl.
*B60N 2/00* (2006.01)
*B60T 7/12* (2006.01)
(Continued)

(52) U.S. Cl.
CPC ......... *G06K 9/00838* (2013.01); *B60N 2/002* (2013.01); *B60T 7/12* (2013.01);
(Continued)

(58) Field of Classification Search
CPC ...... G06K 9/00838; B60N 2/002; B60T 7/12; B60T 7/14
See application file for complete search history.

(56) References Cited

U.S. PATENT DOCUMENTS 8,527,146 B1 * 9/2013 Jackson ............ B60W 50/0098
180/273
8,874,301 B1 * 10/2014 Rao ....................... B60K 28/066
701/25
(Continued)

FOREIGN PATENT DOCUMENTS

DE  102012008374 A1  11/2012
DE  102012007986 A1  10/2013
(Continued)

OTHER PUBLICATIONS

Kim, Seong-Woo, Liu Wei, Marczuk, Katanarzyna Anna. "Autonomous Parking form a Random Drop Point" 2014 IEEE Intelligent Vehicle Symposium. 2014 (Year: 2014).*
(Continued)

*Primary Examiner* — Kim Y Vu
*Assistant Examiner* — Molly Delaney
(74) *Attorney, Agent, or Firm* — Norton Rose Fulbright US LLP; Gerard Messina

(57) ABSTRACT

A method for monitoring a vehicle that is in an autonomous operating mode and is located in a parking facility. In the method, a check is performed to determine whether one or multiple persons are located in the interior of the vehicle, and one or multiple actions are performed as a function of the check. A corresponding device and a computer program are also described.

15 Claims, 1 Drawing Sheet

(51) Int. Cl.
*B60T 7/14* (2006.01)
*G06K 9/00* (2006.01)
*G08G 1/14* (2006.01)
*B60W 30/06* (2006.01)

(52) U.S. Cl.
CPC .............. *B60T 7/14* (2013.01); *B60W 30/06* (2013.01); *G08G 1/145* (2013.01); *G08G 1/149* (2013.01)

(56) References Cited

U.S. PATENT DOCUMENTS

| | | | |
|---|---|---|---|
| 10,106,156 B1 * | 10/2018 | Nave ................... | B60W 30/09 |
| 2005/0270177 A1 | 12/2005 | Mori et al. | |
| 2007/0132220 A1 * | 6/2007 | Breed ............... | B60R 21/01516 |
| | | | 280/735 |
| 2008/0157940 A1 * | 7/2008 | Breed ..................... | B60C 11/24 |
| | | | 340/425.5 |
| 2010/0222976 A1 * | 9/2010 | Haug ..................... | B60K 28/04 |
| | | | 701/70 |
| 2011/0082588 A1 | 4/2011 | McDowell, Jr. et al. | |
| 2013/0231824 A1 | 9/2013 | Wilson et al. | |
| 2014/0210646 A1 * | 7/2014 | Subramanya ........... | B61L 29/28 |
| | | | 340/928 |
| 2014/0320318 A1 * | 10/2014 | Victor ................... | G08G 1/142 |
| | | | 340/932.2 |
| 2014/0379197 A1 * | 12/2014 | Eckert ....................... | B60T 7/22 |
| | | | 701/28 |
| 2016/0185345 A1 * | 6/2016 | Sasabuchi ............. | B60W 30/08 |
| | | | 701/301 |
| 2016/0303972 A1 * | 10/2016 | Kuhne ................... | B60W 30/12 |
| 2016/0328976 A1 | 11/2016 | Jo et al. | |
| 2017/0080900 A1 | 3/2017 | Huennekens et al. | |
| 2018/0276903 A1 * | 9/2018 | Rai ...................... | G01C 21/3697 |

FOREIGN PATENT DOCUMENTS

| | | |
|---|---|---|
| DE | 102012222562 A1 | 6/2014 |
| JP | 2002109677 A | 4/2002 |
| JP | 2011054116 A | 3/2011 |
| JP | 2011230549 A | 11/2011 |
| KR | 20140073131 A | 6/2014 |

OTHER PUBLICATIONS

International Search Report dated Apr. 18, 2016, of the corresponding International Application PCT/EP2016/051317 filed Jan. 22, 2016.

* cited by examiner

METHOD AND DEVICE FOR MONITORING A VEHICLE THAT IS IN AN AUTONOMOUS OPERATING MODE AND IS LOCATED IN A PARKING FACILITY

FIELD

The present invention relates to a method and a device for monitoring a vehicle that is in an autonomous operating mode and is located in a parking facility. The present invention further relates to a computer program.

BACKGROUND INFORMATION

German Patent Application No. DE 10 2012 222 562 A1 shows a system for managed parking areas for transferring a vehicle from a starting position to a destination position.

In fully automated (autonomous) so-called valet parking, a vehicle is parked by its driver at a drop-off point, for example in front of a parking garage, and from there the vehicle drives itself into a parking position/parking space and back again to the drop-off point.

In this autonomous valet parking, it is possible that there are still persons in the vehicle. This can result in problems. Thus, it is possible that these persons leave the vehicle during the parking process. This may have the consequence that these persons disrupt an operation of the parking facility. In particular, these persons may disrupt an autonomous valet parking operation.

SUMMARY

An object of the present invention is to provide an efficient concept that ensures that autonomous parking processes in a parking facility are not disrupted by persons.

This object may be achieved in accordance with the present invention. Advantageous developments of the present invention are described herein.

According to one aspect of the present invention, a method is provided for monitoring a vehicle that is in an autonomous operating mode and is located in a parking facility,
- a check being performed to determine whether one or multiple persons are present in the interior of the vehicle,
- one or multiple actions being performed as a function of the check.

According to another aspect, a device is provided for monitoring a vehicle that is in an autonomous operating mode and is located in a parking facility, comprising:
- a checking device for checking whether one or multiple persons are present in the interior of the vehicle, and
- a control device for controlling one or more actions as a function of the check.

According to yet another aspect, a computer program is provided, comprising program code for implementing the method according to the present invention when the computer program is executed on a computer.

The present invention thus includes, for example, ensuring that no persons are present in the vehicle that is about to perform an autonomous parking process in the parking facility or that is already performing such an autonomous parking process. In accordance with the present invention, a check is performed to determine whether one or more persons are present in the vehicle. If this is the case, one or more actions are performed. This effects in particular the technical advantage of making it possible to react efficiently and in optimized fashion to a possible presence of persons in the interior of the vehicle. In accordance with the performed actions, it is thus advantageously possible to prevent these persons from disrupting an operation of the parking facility, that is, in particular a flow of traffic or a traffic in the parking facility. In particular, it is thus advantageously possible to reduce a collision risk of a collision between the persons and other objects in the parking facility. For if these persons should exit the vehicle, then a collision with the other objects could result. Since, however, in accordance with the present invention, one or multiple actions are performed as a function of the check, it is possible to reduce or even entirely prevent such a collision risk in accordance with the chosen action.

That the vehicle is in an autonomous operating mode means in particular that the vehicle is driving autonomously or is guided in a remote-controlled manner. In an autonomous operating mode, no intervention of a driver is necessary in order to guide the vehicle. The vehicle is able to drive in the parking facility on its own, that is, autonomously. In particular, the vehicle in an autonomous operating mode may be guided in a remote-controlled manner.

That is to say that, in particular, autonomous in the sense of the present invention means in particular that the vehicle navigates or drives or is guided in a remote-controlled manner in the parking facility independently, that is, without an intervention of a driver. The vehicle drives independently, that is, autonomously, in the parking facility without a driver having to control the vehicle for this purpose or having to be present in the vehicle. A guidance or an autonomous driving comprises in particular a lateral and/or a longitudinal guidance of the vehicle. Such an autonomously driving vehicle that is able to park and unpark automatically is referred to in the sense of the present invention as an AVP vehicle. "AVP" here stands for "automatic valet parking" and may be translated as "automatic parking process" or "autonomous parking process". Vehicles that do not have this AVP functionality are referred to as normal vehicles for example.

A parking facility in the sense of the present invention may also be called a parking area and is used as an area for parking vehicles. The parking facility thus forms in particular a contiguous area, which has multiple parking spaces (in the case of a parking lot on private property) or parking stalls (in the case of a parking lot on public property). According to one specific embodiment, the parking facility may be comprised by a car park. In particular, the parking facility is comprised by a parking garage.

Thus, the present invention includes that the vehicle must be in an autonomous operating mode in order for one or more actions to be performed in accordance with the check ensures in particular that actions are not performed already in normal travel, that is, when the vehicle is not in the autonomous operating mode. For during such normal travel, that is, when the vehicle is not in the autonomous operating mode, a driver must be in the vehicle in order to guide the vehicle manually. Such an operating mode, in which a driver must guide the vehicle manually, may be called in particular a manual operating mode. That is to say, in particular, that the concept of the present invention is implemented only when the vehicle is traveling autonomously, that is, if it is just about to implement an autonomous parking process or is already implementing the autonomous parking process.

An autonomous parking process includes in particular an autonomous drive from a drop-off position to a parking position.

An autonomous parking process includes in particular an autonomous parking of the vehicle into a parking position.

An autonomous parking process includes in particular an unparking of the vehicle from a parking position.

An autonomous parking process of the vehicle includes in particular an autonomous drive from a parking position to a pick-up position.

A drop-off position in the sense of the present invention is a position at which a driver of the vehicle is able to leave his vehicle for an autonomous parking process. The drop-off position is preferably located within an entrance area of the parking facility.

A pick-up position in the sense of the present invention is a position, at which a driver of the vehicle is able to pick up his vehicle following an autonomous parking process. The pick-up position is located for example in the area of an exit of the parking facility, that is, within an exit area of the parking facility.

According to one specific embodiment, the drop-off position and the pick-up position are distinct.

According to one specific embodiment, the pick-up position and the drop-off position are identical.

One specific embodiment provides for the one or the multiple actions to include the transmission of a stop command to the vehicle via a communication network to the effect that the vehicle is to stop. This effects in particular the technical advantage that the vehicle is able to stop in response to the stop command. That is to say in particular that the vehicle stops when it carries out the stop command. A stopped vehicle normally presents a lower collision risk or a lower danger of collision than a moving vehicle. This advantageously makes it possible to avoid a collision of the vehicle with other vehicles in the parking facility.

Another specific embodiment provides for the one or the multiple actions to include the transmission of a diversion command including an evasion position to the vehicle via a communication network to the effect that the vehicle is to drive autonomously to the evasion position. This effects in particular the technical advantage that the vehicle is able to drive autonomously to the evasion position in response to receiving the diversion command. This makes it possible for example to withdraw the vehicle from a traffic of the parking facility so as thereby to be able to reduce a risk of collision. That is to say that the vehicle drives autonomously to the evasion position when it carries out the diversion command.

Another specific embodiment provides for an evasion trajectory to be driven by the vehicle to the evasion position to be additionally transmitted to the vehicle via the communication network. This effects in particular the technical advantage of being able to prescribe to the vehicle on which trajectory, that is, on which route, it is to drive to the evasion position. For normally a knowledge required to ascertain an optimal evasion trajectory is greater outside of the vehicle than a knowledge internal to the vehicle. That is to say that outside of the vehicle it is possible to ascertain a better evasion trajectory, which is better able to take into account in particular a traffic in the parking facility. It is thus possible to guide the vehicle to the evasion position in optimized and efficient fashion, and the vehicle thus represents less of a risk for a traffic in the parking facility. This also serves to reduce a risk of collision further.

Another specific embodiment provides for the one or multiple actions to include blocking and/or diverting a travel path of the vehicle using travel path-controlling infrastructure. This effects in particular the technical advantage of being able to prevent the vehicle from continuing to travel. In particular, it effects the technical advantage of making it possible to take the vehicle out of a traffic or traffic flow of the parking facility on the basis of the diversion. In particular, it makes it possible to divert the vehicle out of a reserved area, such a reserved area being an area that is authorized or reserved only for AVP vehicles. For persons should normally not be present in such an area since this presence could disrupt a normal operation in this reserved area.

Another specific embodiment provides for the travel path-controlling infrastructure to include one or more signaling devices. Such signaling devices are commonly also referred to as traffic lights. Thus, the signaling devices may indicate to traffic that such traffic should stop so that it does not continue to approach the vehicle. In particular, the vehicle having the persons in the interior may thus be signaled that it should stop. For normally a vehicle that is in an autonomous operating mode is able to detect such signaling devices and to stop in accordance with the transmitted signal.

Another specific embodiment provides for the travel path-controlling infrastructure to include one or more barriers. That is to say in particular that one or more barriers is/are closed for example in order to block a travel path of the vehicle and/or to divert the vehicle.

Another specific embodiment provides for the one or the multiple actions to include signaling the person(s) present in the interior of the vehicle by way of a signaling infrastructure that a presence in the interior is inadmissible. This effects in particular the technical advantage that the persons who are present in the vehicle become cognizant of the fact that their presence in the interior is inadmissible, that is, that it is in particular not desired. Thus, these persons may then decide not to leave the vehicle, which in turn would prevent these persons from disrupting an operation of the parking facility.

According to one specific embodiment, the signaling infrastructure includes an acoustic signaling device and/or a visual signaling device and/or an information sign and/or a haptic signaling device. A visual signaling device includes for example a hazard warning signal, a warning light or a flashing light. An acoustic signaling device includes for example a loudspeaker allowing for audio announcements.

One specific embodiment provides for the one or the multiple actions to include that the person(s) present in the interior of the vehicle is/are signaled that a presence in the interior is inadmissible. The choice of the formulation "in the interior" here indicates that the signaling function is provided in the interior. That is to say that a signal is output in the interior. A signal comprises for example an acoustic and/or a haptic and/or a visual signal. Signaling devices inside the vehicle may be used for this purpose for example. For example, it is possible for a passenger compartment lighting to be switched on and off. The on-board signaling device(s), for example the passenger compartment lighting, is/are controlled remotely via the communication network, that is, a corresponding remote control is performed. For example, it is possible that a music system, for example a radio system, is remote-controlled in such a way that an audio announcement, that is, an audio signal, is output via the music system. The vehicle occupants are thus advantageously informed directly. Thus, the parking facility management may initiate this remote control. That is to say that the output of the information (haptically and/or visually and/or acoustically) that the presence is inadmissible occurs in the vehicle, that is, internal to the vehicle.

One specific embodiment provides for the one or the multiple actions to include ordering parking facility personnel to the vehicle. This effects in particular the technical advantage that the parking facility personnel is able to resolve the situation quickly and efficiently.

Another specific embodiment provides for the check to include detecting the interior of the vehicle sensorially at least partially, in particular entirely, using a vehicle sensor system so that sensor data corresponding to the detection are analyzed for a presence of one or multiple persons. This effects in particular the technical advantage that the check may be performed efficiently using an already existing sensor system, in this case in particular the vehicle sensor system.

A vehicle sensor system includes according to one specific embodiment in particular a video camera for monitoring the interior of the vehicle. Such a video camera is in particular also called a passenger compartment camera.

In one specific embodiment, the vehicle sensor system includes one or multiple passenger presence sensors that are designed or developed to detect an occupancy state of one or of multiple vehicle seats.

The vehicle sensor system generates or produces sensor data corresponding to the sensorial detection. These sensor data are then analyzed for a presence of one or multiple persons.

Another specific embodiment provides for the sensor data to be transmitted via a communication network to an off-board processing device that performs the analysis. This effects in particular the technical advantage that the analysis is able to be performed outside of the vehicle.

One specific embodiment provides for a result of the analysis of the sensor data to be transmitted from the vehicle via the communication network. The result may be transmitted to the device of the present invention for example.

One specific embodiment provides for the check to include monitoring the interior of the vehicle for the presence of one or multiple persons by way of an off-board monitoring system. This effects in particular the technical advantage of allowing for an efficient utilization of a monitoring system. For normally a parking facility itself already has a monitoring system. This is now additionally used to monitor the interior of the vehicle for a presence of one or multiple persons.

According to one specific embodiment, the off-board monitoring system includes one or multiple video cameras.

According to one specific embodiment, the checking device includes the off-board monitoring system.

According to one specific embodiment, the device is designed or developed to carry out or implement the method of the present invention.

According to one specific embodiment, the control device is developed or designed to control a travel path-controlling infrastructure and/or a signaling infrastructure.

According to one specific embodiment, the device includes a communication interface that is developed to communicate via a communication network, that is, in particular to receive sensor data. In particular, the stop command is transmitted to the vehicle via the communication interface. In particular, the diversion command is transmitted to the vehicle via the communication interface. In particular, the evasion trajectory to be traveled is transmitted to the vehicle via the communication interface.

Accordingly, in one specific embodiment, the vehicle then has likewise a communication interface that is developed to receive corresponding commands and/or transmit sensor data via a communication network.

According to one specific embodiment, the communication network includes a mobile telephony network and/or a WLAN network.

One specific embodiment provides for a communication via the communication network to be encrypted.

Functionalities of the device derive analogously from functionalities of the method and vice versa. That is to say in particular that technical features concerning the device result from corresponding specific embodiments of the method and vice versa.

The present invention is explained in greater detail below with reference to preferred exemplary embodiments.

DETAILED DESCRIPTION OF EXAMPLE EMBODIMENTS

Figure 1:
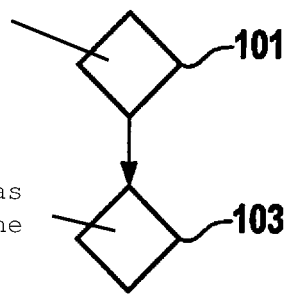
FIG. 1 shows a flow chart of a method for monitoring a vehicle that is in an autonomous operating mode and is located in a parking facility.

FIG. 1 shows a flow chart of a method for monitoring a vehicle that is in an autonomous operating mode and is located in a parking facility.

In a step 101, a check is performed to determine whether one or multiple persons are present in the interior of the vehicle. In a step 103, an action is performed as a function of the check. In particular, multiple actions may be performed as a function of the check.

That is to say that if the check yields the result that one or multiple persons are present in the interior of the vehicle, one or multiple actions are performed.

If the check yields the result that no persons are present in the interior of the vehicle, then no action or no multiple actions is/are performed.

Figure 2:
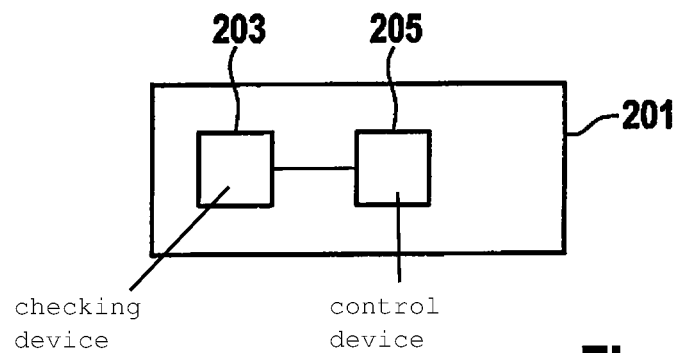
FIG. 2 shows a device for monitoring a vehicle that is in an autonomous operating mode and is located in a parking facility.

FIG. 2 shows a device 201 for monitoring a vehicle that is in an autonomous operating mode and is located in a parking facility.

Device 201 includes a checking device 203 for checking whether one or multiple persons are present in the interior of the vehicle. Device 201 further includes a control device 205 for controlling one or multiple actions as a function of the check.

According to one specific embodiment, device 201 includes an off-board monitoring system.

According to one specific embodiment, device 201 is designed to communicate with a vehicle sensor system in order sensorially to detect the interior of the vehicle at least partially using the vehicle sensor system.

That is to say in particular that the at least partial sensorial detection using the vehicle sensor system is triggered or controlled by way of an off-board detection command.

For in such an autonomous operating mode of a vehicle, which is located in a parking facility, one specific embodiment provides for a communication link via a communication network between a parking facility management server, which may comprise the device for example, and the vehicle. Such a parking facility management server manages and/or coordinates a parking facility or an autonomous parking process in the parking facility.

The present invention thus comprises the idea of providing a technical concept that is able to ensure that no persons are present in an AVP vehicle during AVP travel. The basis of the concept of the present invention is in particular that a check is performed to determine whether one or multiple persons is/are present in the AVP vehicle. According to one specific embodiment, the check is performed by at least one of the following actions:

1. A check by one or multiple video cameras of an off-board monitoring system, which may also be called a parking space monitoring system. For example, this check may be performed at the start of the autonomous parking process at the drop-off position. According to another specific embodiment, this check may preferably still be performed even during AVP travel by the off-board monitoring system.

2. A check by a vehicle sensor system comprising one or multiple vehicle sensors. A vehicle sensor may be a video sensor of a passenger compartment camera for example. Such a vehicle sensor may be in particular a passenger sensor.

If it is determined by these measures, that is, by this check, that persons or only one person are/is present in the vehicle, in particular in the driver seat, then one or any combination of the following actions is initiated or controlled:

1. The vehicle receives a stop command from a parking space management system, that is, from the parking facility management server, that is, from the device for example.

2. The vehicle is diverted to an evasion location, which advantageously has the effect of taking the vehicle out of a traffic of AVP vehicles. The vehicle is thus in particular removed from an AVP operation.

3. Using a travel path-controlling infrastructure, which comprises for example travel path-controlling infrastructure components such as for example one or more signaling devices (commonly also called traffic lights) and/or barriers, a travel path of the vehicle is blocked and a (further) travel of the vehicle is in particular prevented and/or the vehicle is diverted. This also advantageously effects a removal of the vehicle from AVP traffic and/or from an AVP operation.

4. By way of a signaling infrastructure, which comprises for example infrastructure elements such as information signs warning/blinking lights, audio announcements via loudspeakers, a driver or the vehicle occupants is/are informed that traveling along is not desired/allowed.

5. The parking space management system orders personnel, that is, in particular parking facility personnel, to resolve the situation. This includes for example that the personnel is to walk behind the vehicle for example to check the vehicle occupants.

For the specific embodiment, in which the vehicle is driven by authorized personnel, for example because the AVP vehicle is defective or because the vehicle is a official vehicle of the parking facility, another specific embodiment then provides for this travel of persons to be defined in advance as authorized and thus also not to be pursued further, that is, no actions being performed. That is to say that a check is performed according to one specific embodiment as to whether the presence of one or multiple persons in the interior of the vehicle was previously authorized, for example in that a travel of a person in the vehicle was registered. The actions are not performed in the event that the presence is authorized. If no authorization exists, then the actions are performed.

Using the concept of the present invention, it is possible to avoid in particular the following problems that may result if persons are present in the AVP vehicle during AVP travel:

The persons could at some point in time leave the AVP vehicle. This would have the consequence that persons subsequently walk in the parking facility and disrupt an AVP operation. This would make an AVP operation of the AVP vehicles more complex. This is especially so if an exclusive area is reserved for an AVP operation.

2. Furthermore, it may be the case that the AVP vehicle is not locked, a key being present in the vehicle. For this reason as well, it must be ensured that no misuse occurs on the vehicle by (non-authorized) persons (for example by theft of objects from the vehicle) or with the vehicle (driving the vehicle).

3. The driver could for example intervene in an AVP processor or take it over. This could disrupt an entire AVP operation, that is, a parking space process for the AVP. This AVP operation would possibly have to be interrupted. For example, because the driver does not comply with the basic framework conditions (for example regarding speed and right-of-way rules).

The aforementioned problems resulted in the recognition, in accordance with the present invention, that no person must remain in the vehicle during an AVP process. An exception may be for example when the vehicle is driven by authorized personnel. For example, because an AVP vehicle has a fault and must be moved out of the way.

What is claimed is:

1. A method for monitoring a vehicle that is in an autonomous operating mode and is located in a parking facility, the method comprising:
   while the vehicle is operating in the autonomous operating mode in the parking facility, performing:
      monitoring, by a parking facility management server external to the vehicle, an interior of the vehicle using a sensor system of the vehicle via a communication network, based on sensor data from the sensor system of the vehicle,
      determining by the parking facility management server, based on the monitoring, that at least one person is in the interior of the vehicle, and
      based on the determining that at least one person is in the interior of the vehicle, performing, by the parking facility management server, one or multiple actions.

2. The method as recited in claim 1, wherein the one or the multiple actions include transmitting, by the parking facility management server, a stop command to the vehicle via a communication network that the vehicle is to stop, and the method further comprises:
   in response to receipt of the stop command, executing, by the vehicle, the stop command to autonomously stop the vehicle.

3. The method as recited in claim 1, wherein the one or the multiple actions include transmitting, by the parking facility management server, a diversion command including an evasion position to the vehicle via a communication network to the effect that the vehicle is to drive autonomously to the evasion position, and the method further comprises:
   in response to receipt of the diversion command, autonomously driving, by the vehicle, to the evasion position.

4. The method as recited in claim 3, wherein the one of the multiple actions further include transmitting, by the parking facility management server to the vehicle via the communication network, an evasion trajectory position to be driven by the vehicle, and the method further comprises:
   autonomously driving, by the vehicle, in accordance with the evasion trajectory.

5. The method as recited in claim 1, wherein the one or the multiple actions include controlling, by the parking facility management server, travel path-controlling infrastructure to at least one of block and divert a travel path of the vehicle by way of the travel path-controlling infrastructure.

6. The method as recited in claim 5, wherein the travel path-controlling infrastructure is at least one barrier.

7. The method as recited in claim 5, wherein the travel path-controlling infrastructure is at least one traffic light.

8. The method as recited in claim 5, wherein the sensor system of the vehicle includes a camera in the vehicle.

9. The method as recited in claim 5, wherein the sensor system of the vehicle includes at least one seat occupancy sensor in the vehicle.

10. The method as recited in claim 1, wherein the one or the multiple actions include signaling of the person(s) present in the interior of the vehicle by way of a signaling infrastructure that a presence in the interior is inadmissible.

11. The method as recited in claim 1, wherein the vehicle sensor system of the vehicle senses the interior of the vehicle and generates the sensor data, corresponding to the sensing, which are analyzed for the presence of one or multiple persons.

12. The method as recited in claim 11, wherein the sensor data is transmitted via the communication network to parking facility management server, which performs the analysis.

13. The method as recited in claim 1, wherein the one or the multiple actions include a signaling of the persons present in the interior of the vehicle that a presence in the interior is inadmissible.

14. A method for monitoring a vehicle that is in an autonomous operating mode and is located in a parking facility, the method comprising:
   while the vehicle is operating in the autonomous operating mode in the parking facility, performing:
      monitoring, by a parking facility management server external to the vehicle, an interior of the vehicle using a sensor system of the vehicle via a communication network, based on sensor data from the sensor system of the vehicle,
      determining by the parking facility management server, based on the monitoring, that at least one person is in the interior of the vehicle, and
      based on the determining that at least one person is in the interior of the vehicle, ordering parking facility personnel to the vehicle.

15. A non-transitory computer-readable storage medium on which is stored a computer program including program code for monitoring a vehicle that is in an autonomous operating mode and is located in a parking facility, the computer program, when executed by a computer, causing the computer to perform:
   while the vehicle is operating in the autonomous operating mode in the parking facility, performing:
      monitoring, by a parking facility management server external to the vehicle, an interior of the vehicle using a sensor system of the vehicle via a communication network, based on sensor data from the sensor system of the vehicle,
      determining by the parking facility management server, based on the monitoring, that at least one person is in the interior of the vehicle, and
      based on the determining that at least one person is in the interior of the vehicle, performing, by the parking facility management server, one or multiple actions.

* * * * *